(12) United States Patent
Takada et al.

(10) Patent No.: US 9,112,223 B2
(45) Date of Patent: Aug. 18, 2015

(54) ANODE ACTIVE MATERIAL, SECONDARY BATTERY, ELECTRIC POWER TOOL, ELECTRICAL VEHICLE, AND ELECTRIC POWER STORAGE SYSTEM

(75) Inventors: Kazuaki Takada, Fukushima (JP); Hiroshi Inoue, Fukushima (JP); Satoshi Mizutani, Fukushima (JP); Kazuhiko Yoshida, Fukushima (JP); Keitaro Matsui, Fukushima (JP); Koichiro Hirata, Fukushima (JP)

(73) Assignee: SONY CORPORATION (JP)

( * ) Notice: Subject to any disclaimer, the term of this patent is extended or adjusted under 35 U.S.C. 154(b) by 1016 days.

(21) Appl. No.: 13/226,105

(22) Filed: Sep. 6, 2011

(65) Prior Publication Data

US 2012/0082894 A1    Apr. 5, 2012

(30) Foreign Application Priority Data

Sep. 13, 2010    (JP) ................ P2010-204626

(51) Int. Cl.
*H01M 4/38*    (2006.01)
*B60L 11/18*   (2006.01)
*H01M 10/0525* (2010.01)

(52) U.S. Cl.
CPC ............. *H01M 4/38* (2013.01); *B60L 11/1879* (2013.01); *H01M 10/0525* (2013.01); *Y02E 60/122* (2013.01); *Y02T 10/7005* (2013.01); *Y02T 10/705* (2013.01); *Y02T 10/7011* (2013.01)

(58) Field of Classification Search
CPC ........... H01M 4/54; H01M 4/34; H01M 4/38; H01M 4/02; H01M 4/485; H01M 4/5825; H01M 4/525; H01M 10/052; H01M 10/0525
USPC .......................... 429/219, 220, 221
See application file for complete search history.

(56) References Cited

U.S. PATENT DOCUMENTS

| | | | | |
|---|---|---|---|---|
| 7,229,717 | B2* | 6/2007 | Yamaguchi et al. | 429/231.95 |
| 2004/0013941 | A1* | 1/2004 | Kobayashi et al. | 429/231.1 |
| 2006/0068292 | A1* | 3/2006 | Mizutani et al. | 429/231.8 |
| 2007/0031730 | A1* | 2/2007 | Kawakami et al. | 429/218.1 |
| 2008/0261114 | A1* | 10/2008 | Ishihara | 429/221 |

FOREIGN PATENT DOCUMENTS

| | | |
|---|---|---|
| JP | 2006107792 | 4/2006 |
| JP | 2006-128051 | 5/2006 |
| JP | 2006-344403 | 12/2006 |
| JP | 2008-293955 | 12/2008 |

* cited by examiner

*Primary Examiner* — Miriam Stagg
*Assistant Examiner* — Anne R Dixon
(74) *Attorney, Agent, or Firm* — Sheridan Ross P.C.

(57) ABSTRACT

A secondary battery includes a cathode, an anode containing an anode active material, and an electrolytic solution. The anode active material contains tin, iron, cobalt, carbon, and titanium as an element. In the anode active material, a carbon content is from 9 mass % to 30 mass % both inclusive, a ratio of cobalt to total of iron and cobalt is from 10 mass % to 80 mass % both inclusive, a ratio of the total of iron and cobalt to total of tin, iron, and cobalt is from 11.3 mass % to 26.3 mass % both inclusive, a titanium content is from 0.5 mass % to 8 mass % both inclusive, and half-width of diffraction peak obtained by X-ray diffraction (peak obtained where diffraction angle of 2θ is from 34 deg to 37 deg both inclusive) is 1 deg or more.

10 Claims, 7 Drawing Sheets

ANODE ACTIVE MATERIAL, SECONDARY BATTERY, ELECTRIC POWER TOOL, ELECTRICAL VEHICLE, AND ELECTRIC POWER STORAGE SYSTEM

CROSS-REFERENCE TO RELATED APPLICATION

This application claims priority from Japanese Patent Application No. 2010-204626 filed on Sep. 13, 2010, the entire disclosure of which is hereby incorporated herein by reference.

BACKGROUND

The present disclosure relates to an anode active material containing tin, iron, cobalt, carbon, and titanium as an element, a secondary battery using the anode active material, an electric power tool using the secondary battery, an electrical vehicle using the secondary battery, and an electric power storage system using the secondary battery.

In recent years, small electronic devices represented by a portable terminal or the like have been widely used, and it is strongly demanded to reduce their size and weight and to achieve their long life. Accordingly, as a power source for the small electronic devices, a battery, in particular, a small and light-weight secondary battery capable of providing a high energy density has been developed. In recent years, it has been considered to apply such a secondary battery not only to the small electronic devices but also to a large electronic devices represented by a vehicle or the like.

It has been examined to use various elements as a carrier (electrode reactant) of the secondary battery. Specially, a lithium ion secondary battery using lithium (Li) as an electrode reactant and using insertion and extraction of lithium ions as charge and discharge reaction has been largely prospective, since such a lithium ion secondary battery is able to provide a higher energy density than a lead battery, a nickel cadmium battery and the like.

As an active material of the anode in the secondary battery, in addition to a carbon material such as graphite, a metal material such as silicon (Si) and tin (Sn) is used for attaining a high capacity. However, in recent years, a new material has been progressively developed for the purpose of achieving a higher capacity and improving cycle characteristics and the like. Specifically, a low crystalline material which contains tin, cobalt (Co), and carbon (C) as an element, and in which the half-width of the diffraction peak obtained by X-ray diffraction is 1 deg or more has been examined (for example, see Japanese Unexamined Patent Application Publication Nos. 2006-107792, 2006-128051, 2006-344403, and 2008-293955). In the low crystalline material, in some cases, iron (Fe) is used instead of cobalt, and cobalt and iron are used together.

SUMMARY

In these years, the high performance and the multi functions of the electronic devices are increasingly developed, and usage frequency thereof is increased. Thus, the secondary battery tends to be frequently charged and discharged. Accordingly, in order to demonstrate sufficient battery performance both in the initial state with a small number of charge and discharge and in a state after numbers of charge and discharge are repeated, improvement of initial charge and discharge characteristics and cycle characteristics have been aspired.

In view of the foregoing disadvantages, in the present disclosure, it is desirable to provide an anode active material with which superior initial charge and discharge characteristics and cycle characteristics are able to be obtained, a secondary battery, an electric power tool, an electrical vehicle, and an electric power storage system.

According to an embodiment of the present disclosure, there is provided an anode active material containing tin, iron, cobalt, carbon, and titanium as an element. A carbon content is from 9 mass % to 30 mass % both inclusive, a ratio of cobalt to total of iron and cobalt (Co/(Fe+Co)) is from 10 mass % to 80 mass % both inclusive, a ratio of the total of iron and cobalt to total of tin, iron, and cobalt ((Fe+Co)/(Sn+Fe+Co)) is from 11.3 mass % to 26.3 mass % both inclusive, and a titanium content is from 0.5 mass % to 8 mass % both inclusive. Half-width of diffraction peak obtained by X-ray diffraction (peak obtained where diffraction angle of 2θ is from 34 deg to 37 deg both inclusive) is 1 deg or more.

According to an embodiment of the present disclosure, there is provided a secondary battery including a cathode, an anode containing an anode active material, and an electrolytic solution. The anode active material has a structure similar to that of the anode active material of the foregoing embodiment of the present disclosure. Further, an electric power tool, an electrical vehicle, and an electric power storage system of embodiments of the present disclosure are used for a secondary battery having a structure similar to that of the secondary battery of the embodiment of the foregoing present disclosure.

According to the anode active material of the embodiment of the disclosure and the secondary battery using the same, the anode active material contains tin, iron, cobalt, carbon, and titanium as an element, and the contents of the respective elements and the half-width of the diffraction peak obtained by X-ray diffraction satisfy the foregoing conditions. Thus, superior initial charge and discharge characteristics and superior cycle characteristics are able to be obtained. Thereby, in the electric power tool, the electrical vehicle, and the electric power storage system of the embodiments of the present disclosure, similar effect is able to be obtained.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION OF THE PREFERRED EMBODIMENT

Figure 1:
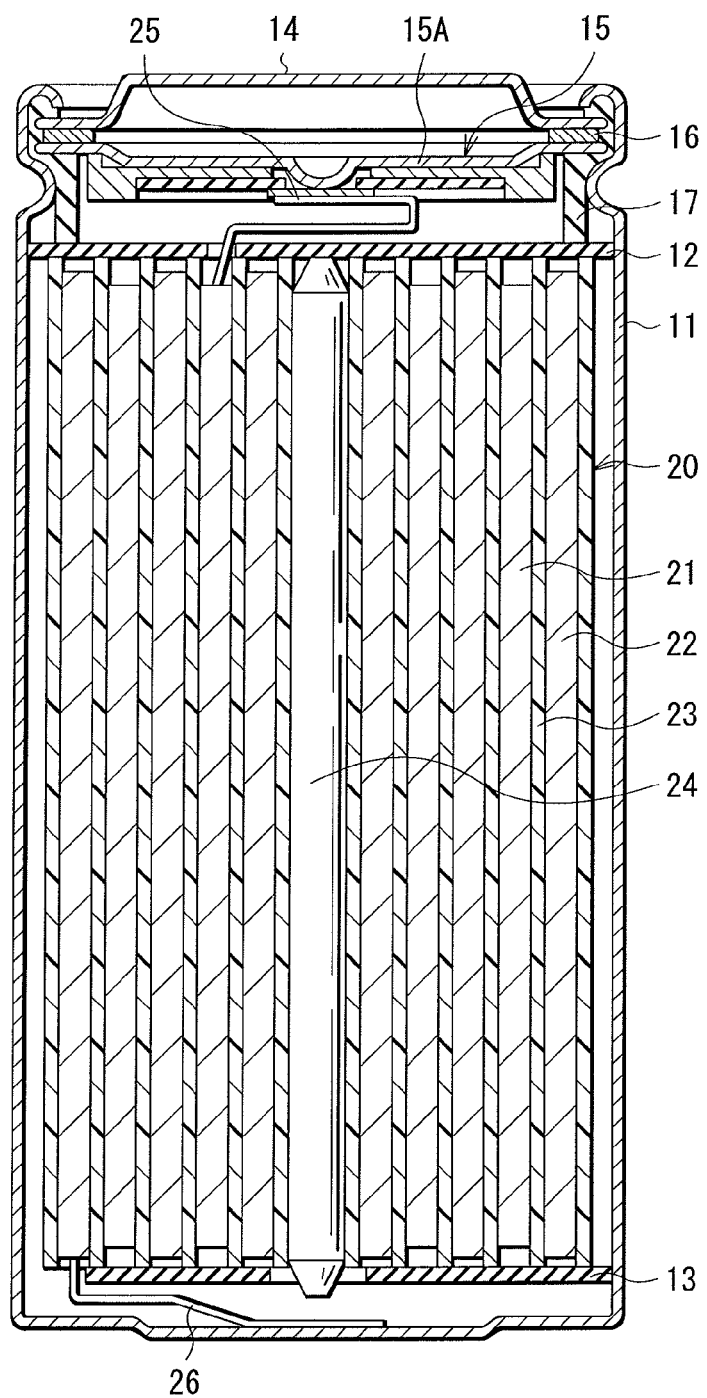
FIG. 1 is a cross sectional view illustrating a structure of a cylindrical secondary battery using an anode active material of an embodiment of the present disclosure.

An embodiment of the present disclosure will be hereinafter described in detail with reference to the drawings. The description will be given in the following order.
1. Anode active material
2. Secondary battery using the anode active material
   2-1. Cylindrical type
   2-2. Laminated film type
   2-3. Lamination type
3. Application of the secondary battery <1. Anode Active Material>

The anode active material of the embodiment of the present disclosure is able to be reacted with an electrode reactant, and is used for a secondary battery or the like. The electrode reactant is a material that comes/goes to a cathode and an anode in electrode reaction. For example, the electrode reactant is a light metal belonging to Group 1, Group 2, or Group 13 in the long periodic table. The light metal in Group 1 is, for example, lithium, sodium (Na), potassium (K) or the like. The light metal in Group 2 is, for example, magnesium (Mg), calcium (Ca) or the like. The light metal in Group 13 is, for example, aluminum (Al) or the like.

[Composition of the Anode Active Material: First to Fifth Elements]

The anode active material contains tin, iron, and cobalt as an element (first to third elements). Tin has a large reactive amount with an electrode reactant per unit mass, and thus tin provides a high capacity. Further, it is difficult to obtain sufficient cycle characteristics only by using tin simple substance. However, cycle characteristics are improved by containing iron and cobalt together with tin.

The contents of iron and cobalt are preferably from 11.3 mass % to 26.3 mass % both inclusive as a ratio of the total of iron and cobalt to the total of tin, iron, and cobalt ((Fe+Co)/(Sn+Fe+Co)). In the case where the ratio is smaller than 11.3 mass %, since iron and cobalt are excessively small, sufficient initial charge and discharge characteristics and sufficient cycle characteristics are not able to be obtained. Meanwhile, in the case where the ratio is larger than 26.3 mass %, since tin is excessively small, a capacity larger than that of the existing anode active material (carbon material or the like) is not able to be obtained.

The content of cobalt is preferably from 10 mass % to 80 mass % both inclusive as a ratio of cobalt to the total of iron and cobalt (Co/(Fe+Co)). In the case where the ratio is smaller than 10 mass %, since cobalt is excessively small, sufficient cycle characteristics are not able to be obtained. Meanwhile, in the case where the ratio is larger than 80 mass %, since tin is excessively small, a capacity larger than that of the existing anode active material is not able to be obtained.

The anode active material further contains carbon as an element (fourth element). In the case where the anode active material contains carbon together with tin, iron, and cobalt described above, cycle characteristics are more improved.

The content of carbon is preferably from 9 mass % to 30 mass % both inclusive. In the case where the carbon content is out of the foregoing range, sufficient cycle characteristics are not able to be obtained.

The anode active material contains titanium as an element (fifth element). In the case where the anode active material contains titanium together with tin, iron, and cobalt described above, initial charge and discharge characteristics and cycle characteristics are more improved.

The content of titanium is preferably from 0.5 mass % to 8 mass % both inclusive. In the case where the titanium content is out of the foregoing range, sufficient initial charge and discharge characteristics and sufficient cycle characteristics are not able to be obtained.

[Composition of the Anode Active Material: Sixth Element]

The anode active material may further contain at least one of silver, phosphorus, antimony, aluminum, vanadium, chromium, niobium, bismuth, tantalum, nickel, copper, zinc, gallium, indium, tungsten, and molybdenum as an element (sixth element), since thereby cycle characteristics tend to be improved without largely lowering initial charge and discharge characteristics.

Though the content of silver or the like is not particularly limited, the content of silver or the like is, in particular, preferably from 0.1 mass % to 14.9 mass % both inclusive, since thereby higher effect is able to be obtained.

[Physical Property of the Anode Active Material]

The anode active material has a low crystalline phase or an amorphous phase. The phase is a reaction phase capable of being reacted with the electrode reactant. The low crystalline phase and the amorphous phase may be mixed. Due to existence of the reaction phase, superior cycle characteristics are able to be obtained. The reaction phase contains, for example, the foregoing respective elements. The reaction phase may become in a state of low crystal or amorphous mainly by carbon. In some cases, the anode active material has a phase containing simple substances of the respective elements or part thereof in addition to the foregoing low crystalline phase or the foregoing amorphous phase.

The diffraction peak of the reaction phase obtained by X-ray diffraction is obtained in the range from $2\theta=20$ deg to 50 deg both inclusive, where CuKα ray is used as a specific X ray, and the trace speed is 1 deg/min. It is easily determined whether or not the diffraction peak obtained by X-ray diffraction is derived from the reaction phase by comparing an X-ray diffraction chart before the electrochemical reaction with the electrode reactant to an X-ray diffraction chart after the electrochemical reaction with the electrode reactant. For example, if the diffraction peak position after the electrochemical reaction with the electrode reactant is changed from the diffraction peak position before the electrochemical reaction with the electrode reactant, the diffraction peak obtained by X-ray diffraction of the phase is derived from the reaction phase.

In particular, the half-width of the diffraction peak obtained by X-ray diffraction of the anode active material having a reaction phase (peak obtained where diffraction angle of $2\theta$ is from 34 deg to 37 deg both inclusive) is 1 deg or more, since thereby the electrode reactant is smoothly inserted and extracted in the anode active material, and anode active material reactivity with the electrolyte is decreased. The specific X ray type and the trace speed value are as described above.

In the anode active material, at least part of carbon as an element is preferably bonded to a metal element or a metalloid element as other element. Lowered cycle characteristics may be caused by cohesion or crystallization of tin or the like. However, if carbon is bonded to other element, cohesion or crystallization of tin or the like is inhibited.

Examples of method for examining bonding state of elements include X-ray Photoelectron Spectroscopy (XPS). XPS is a method for examining element composition and element bonding state in the region up to several nm from the sample surface by irradiating the sample with soft X ray and measuring motion energy of a photoelectron jumping out from the sample surface. Examples of soft X ray include Al—Kα ray and Mg—Kα ray.

The binding energy of an inner orbital electron of an element is changed correlatively to the charge density on the element in a first approximate manner. For example, in the case where the charge density of carbon element is decreased by being affected by interaction with an element existing in the vicinity thereof, an outer orbital electron such as 2p electron is decreased, and thus 1s electron of carbon element is subject to strong binding force by the orbit. That is, in the case where the charge density of the element is decreased, the binding energy becomes high. In XPS, in the case where the binding energy becomes high, the peak is shifted to a higher energy region.

In the case of graphite, the peak of 1s orbit of carbon (C1s) is shown at 284.5 eV in the apparatus in which energy calibration is made so that the peak of 4f orbit of gold atom (Au4f) is obtained at 84.0 eV. In the case of surface contamination carbon, the peak is shown at 284.8 eV. Meanwhile, in the case of higher charge density of carbon element, for example, in the case where carbon is bonded to an element that is more positive than carbon, the peak of C1s is shown in the region lower than 284.5 eV. That is, in the case where at least part of carbon contained in the anode active material is bonded to the metal element, the metalloid element or the like as other element, the peak of the composite wave of C1s obtained for the anode active material is shown in the region lower than 284.5 eV.

In performing XPS measurement, in the case where the surface of the anode active material is covered with surface contamination carbon, the surface of the anode active material is preferably slightly sputtered by using an argon ion gun attached to an XPS device. Further, if the anode active material as a measuring target exists in the anode of the after-mentioned secondary battery, it is preferable that after the secondary battery is disassembled and the anode is taken out, the anode is washed with a volatile solvent such as dimethyl carbonate in order to remove a low volatile solvent and an electrolyte salt existing on the surface of the anode. Such sampling is desirably performed under the inert atmosphere.

Further, in XPS measurement, for example, the peak of C1s is used for correcting the energy axis of spectrums. Since surface contamination carbon generally exists on a material surface, the peak of C1s of the surface contamination carbon is set to in 284.8 eV, which is used as an energy reference. In XPS measurement, the waveform of the peak of C1s is obtained as a form including the peak of the surface contamination carbon and the peak of carbon in the anode active material. Therefore, for example, by performing analysis by using commercially available software, the peak of the surface contamination carbon and the peak of carbon in the anode active material are separated. In the analysis of the waveform, the position of the main peak existing on the lowest binding energy side is set to the energy reference (284.8 eV).

[Manufacturing Method of the Anode Active Material]

The anode active material is able to be formed by, for example, mixing raw materials having the respective elements, dissolving the resultant mixture in an electric furnace, a high frequency induction furnace, an arc melting furnace or the like, and subsequently solidifying the resultant. Otherwise, the anode active material may be formed by various atomization methods (gas atomizing or water atomizing); various roll methods; or a method using mechanochemical reaction (mechanical alloying method or mechanical milling method). Specially, the method using mechanochemical reaction is preferable, since thereby the anode active material easily becomes the low crystalline structure or the amorphous structure. In the method using the mechanochemical reaction, for example, a planetary ball mill apparatus or the like is able to be used.

As the raw material, though a mixture of simple substances of the respective elements may be used, an alloy is preferably used for part of elements other then carbon. In the case where carbon is added to the alloy and thereby the material is synthesized by using mechanical alloying method, the low crystalline structure or the amorphous structure of the anode active material is able to be realized and necessary time (reaction time) is able to be shortened as well. The state of the raw material may be powder or a massive.

As the carbon used as a raw material, for example, one or more of graphitizable carbon, non-graphitizable carbon, graphite, pyrolytic carbon, coke, glassy carbons, an organic polymer compound fired body, activated carbon, and carbon black are used. The coke includes pitch coke, needle coke, petroleum coke and the like. The organic polymer compound fired body is obtained by firing (carbonizing) a polymer compound such as a phenol resin and a furan resin at an appropriate temperature. The shape of the carbon material may be any of a fibrous shape, a spherical shape, a granular shape, and a scale-like shape.

[Action and Effect of the Anode Active Material]

The anode active material contains tin, iron, cobalt, carbon, and titanium as an element, and the contents of the respective elements and the half-width of the diffraction peak obtained by X-ray diffraction satisfy the foregoing conditions. Thereby, from the first charge and discharge, the discharge capacity is increased and the charge and discharge efficiency is increased. Further, even after charge and discharge are repeated, the charge and discharge efficiency is less likely to be lowered. Thus, superior initial charge and discharge characteristics and superior cycle characteristics are able to be obtained. Further, in the case where the anode active material further contains silver or the like as an element, higher effect is able to be obtained.

<2. Secondary Battery using the Anode Active Material>

Next, a description will be given of application examples of the foregoing anode active material. The anode active material is applicable to various devices using electrode reaction. A description will be given of a secondary battery as an application example of the anode active material. The secondary battery described below is a lithium ion secondary battery in which the anode capacity is expressed by insertion and extraction of lithium.

<2-1. Cylindrical Type>

Figure 2:
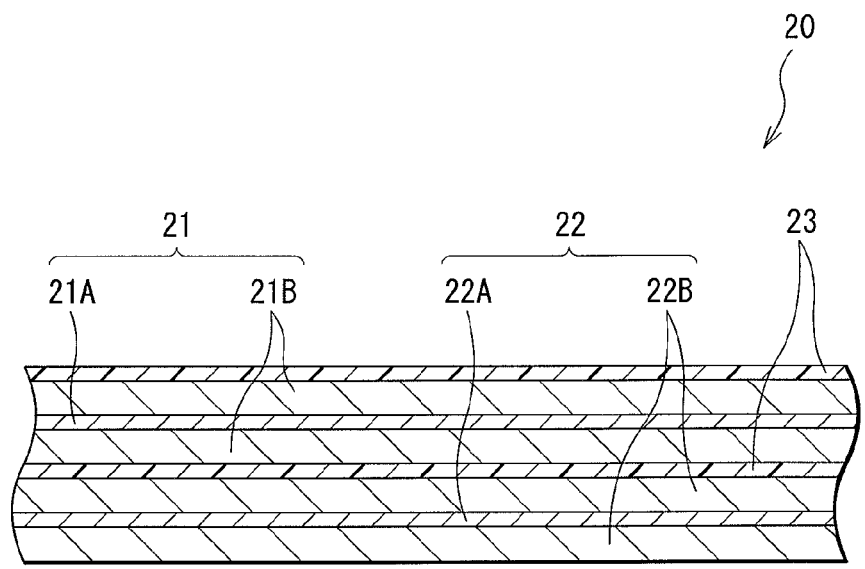
FIG. 2 is a cross sectional view illustrating an enlarged part of a spirally wound electrode body illustrated in FIG. 1.

FIG. 1 illustrates a cross sectional structure of a cylindrical type secondary battery. FIG. 2 illustrates an enlarged part of a spirally wound electrode body 20 illustrated in FIG. 1.

[Whole Structure of the Secondary Battery]

The secondary battery mainly contains the spirally wound electrode body 20 and a pair of insulating plates 12 and 13 inside a battery can 11 in the shape of an approximately hollow cylinder. The spirally wound electrode body 20 is a spirally wound laminated body in which a cathode 21 and an anode 22 are layered with a separator 23 in between and are spirally wound.

The battery can 11 has a hollow structure in which one end of the battery can 11 is closed and the other end thereof is opened. The battery can 11 is made of, for example, iron, aluminum, an alloy thereof or the like. In the case where the battery can 11 is made of iron, for example, plating of nickel or the like may be provided on the surface of the battery can 11. The pair of insulating plates 12 and 13 is arranged to sandwich the spirally wound electrode body 20 in between from the upper and the lower sides, and to extend perpendicularly to the spirally wound periphery face.

At the open end of the battery can 11, a battery cover 14, a safety valve mechanism 15, and a PTC (Positive Temperature Coefficient) device 16 are attached by being caulked with a gasket 17. Inside of the battery can 11 is hermetically sealed. The battery cover 14 is made of, for example, a material similar to that of the battery can 11. The safety valve mechanism 15 and the PTC device 16 are provided inside the battery cover 14. The safety valve mechanism 15 is electrically connected to the battery cover 14 through the PTC device 16. In the safety valve mechanism 15, in the case where the internal pressure becomes a certain level or more by internal short circuit, external heating or the like, a disk plate 15A flips to cut the electric connection between the battery cover 14 and the spirally wound electrode body 20. As temperature rises, the PTC device 16 increases the resistance and thereby abnormal heat generation resulting from a large current is prevented. The gasket 17 is made of, for example, an insulating material. The surface of the gasket 17 may be coated with asphalt.

In the center of the spirally wound electrode body 20, a center pin 24 may be inserted. A cathode lead 25 made of a conductive material such as aluminum is connected to the cathode 21, and an anode lead 26 made of a conductive material such as nickel is connected to the anode 22. The cathode lead 25 is electrically connected to the battery cover 14 by, for example, being welded to the safety valve mechanism 15. The anode lead 26 is, for example, welded and thereby electrically connected to the battery can 11.

[Cathode]

In the cathode 21, a cathode active material layer 21B is provided on a single face or both faces of a cathode current collector 21A.

The cathode current collector 21A is made of, for example, a conductive material such as aluminum, nickel, and stainless steel.

The cathode active material layer 21B contains one or more cathode materials capable of inserting and extracting lithium ions. According to needs, the cathode active material layer 21B may contain other material such as a cathode binder and a cathode conductive agent.

As the cathode active material, a lithium-containing compound is preferable, since thereby a high energy density is able to be obtained. Examples of the lithium-containing compounds include a composite oxide having lithium and a transition metal element as an element and a phosphate compound containing lithium and a transition metal element as an element. Specially, a compound containing one or more of cobalt (Co), nickel, manganese (Mn), and iron (Fe) as a transition metal element is preferably contained as a transition metal element, since thereby a higher voltage is obtained. The chemical formula thereof is expressed by, for example, $Li_xM1O_2$ or $Li_yM2PO_4$. In the formula, M1 and M2 represent one or more transition metal elements. Values of x and y vary according to the charge and discharge state, and are generally in the range of $0.05 \leq x \leq 1.10$ and $0.05 \leq y \leq 1.10$.

Examples of composite oxides having lithium and a transition metal element include a lithium-cobalt composite oxide ($Li_xCoO_2$), a lithium-nickel composite oxide ($Li_xNiO_2$), and a lithium-nickel composite oxide expressed by the following Chemical formula. Examples of phosphate compounds having lithium and a transition metal element include lithium-iron phosphate compound ($LiFePO_4$) and a lithium-iron-manganese phosphate compound ($LiFe_{1-u}Mn_uPO_4$ (u<1)), since thereby a high battery capacity is able to be obtained and superior cycle characteristics are able to be obtained.

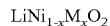
$$LiNi_{1-x}M_xO_2$$

In the formula, M is one or more of cobalt, manganese, iron, aluminum, vanadium, tin, magnesium, titanium, strontium, calcium, zirconium, molybdenum, technetium, ruthenium, tantalum, tungsten, rhenium, ytterbium, copper, zinc, barium, boron, chromium, silicon, gallium, phosphorus, antimony, and niobium. x is in the range of $0.005 < x < 0.5$.

In addition, examples of cathode active materials include an oxide, a disulfide, a chalcogenide, and a conductive polymer. Examples of oxides include titanium oxide, vanadium oxide, and manganese dioxide. Examples of disulfide include titanium disulfide and molybdenum sulfide. Examples of chalcogenide include niobium selenide. Examples of conductive polymer include sulfur, polyaniline, and polythiophene.

Examples of cathode binders include one or more of a synthetic rubber and a polymer material. Examples of the synthetic rubber include styrene butadiene rubber, fluorinated rubber, and ethylene propylene diene. Examples of the polymer material include polyvinylidene fluoride and polyimide.

Examples of cathode conductive agents include one or more carbon materials and the like. Examples of the carbon materials include graphite, carbon black, acetylene black, and Ketjen black. The cathode conductive agent may be a metal material, a conductive polymer or the like as long as the material has the electric conductivity.

[Anode]

In the anode 22, an anode active material layer 22B is provided on a single face or both faces of an anode current collector 22A.

The anode active material layer 22B contains, for example, the foregoing anode active material. According to needs, the anode active material layer 22B may contain a binder such as polyvinylidene fluoride.

The anode active material layer 22B may contain other material such as other anode active material and an anode conductive agent in addition to the foregoing anode active material. Examples of other anode active materials include a carbon material capable of inserting and extracting lithium. The carbon material is preferable, since the carbon material is able to improve cycle characteristics, and functions as an conductive agent. The carbon material is, for example, similar to that used in manufacturing the anode active material.

[Separator]

The separator 23 separates the cathode 21 from the anode 22, and passes lithium ions while preventing current short circuit resulting from contact of both electrodes. The separator 23 is impregnated with an electrolytic solution as a liquid electrolyte.

The separator 23 is formed from, for example, a porous film made of a synthetic resin or ceramics. The separator 23 may be a laminated film composed of two or more porous films. Examples of synthetic resin include polytetrafluoroethylene, polypropylene, and polyethylene.

[Electrolytic Solution]

The electrolytic solution contains a solvent and an electrolyte salt dissolved therein.

Examples of the solvents include one or more of the non-aqueous solvents (organic solvent) described below. That is, examples thereof include ethylene carbonate, propylene carbonate, butylene carbonate, dimethyl carbonate, diethyl carbonate, ethyl methyl carbonate, methylpropyl carbonate, γ-butyrolactone, γ-valerolactone, 1,2-dimethoxyethane, and tetrahydrofuran. Further examples thereof include 2-methyltetrahydrofuran, tetrahydropyran, 1,3-dioxo lane, 4-methyl-1,3-dioxolane, 1,3-dioxane, and 1,4-dioxane. Furthermore, examples thereof include methyl acetate, ethyl acetate, methyl propionate, ethyl propionate, methyl butyrate, methyl isobutyrate, trimethyl methyl acetate, and trimethyl ethyl acetate. Furthermore, examples thereof include acetonitrile, glutaronitrile, adiponitrile, methoxyacetonitrile, 3-methoxypropionitrile, N,N-dimethylformamide, N-methylpyrrolidinone, and N-methyloxazolidinone. Furthermore, examples thereof include N,N'-dimethylimidazolidinone, nitromethane, nitroethane, sulfolane, trimethyl phosphate, and dimethyl sulfoxide. By using such a compound, superior battery capacity, superior cycle characteristics, superior storage characteristics and the like are able to be obtained.

Specially, at least one of ethylene carbonate, propylene carbonate, dimethyl carbonate, diethyl carbonate, and ethyl methyl carbonate is preferable, since thereby superior characteristics are able to be obtained. In this case, a combination of a high viscosity (high dielectric constant) solvent (for example, specific inductive $\in \geq 30$) such as ethylene carbonate and propylene carbonate and a low viscosity solvent (for example, viscosity$\leq 1$ mPa·s) such as dimethyl carbonate, ethylmethyl carbonate, and diethyl carbonate is more preferable. Thereby, dissociation property of the electrolyte salt and ion mobility are improved.

In particular, the solvent may be cyclic ester carbonates (unsaturated carbon bond cyclic ester carbonates) having one or more unsaturated carbon bonds. Thereby, a stable protective film is formed on the surface of the anode 22 at the time of charge and discharge, and thus decomposition reaction of the electrolytic solution is inhibited. The unsaturated carbon bond cyclic ester carbonate is, for example, vinylene carbonate, vinylethylene carbonate or the like. The content of the unsaturated carbon bond cyclic ester carbonate in the nonaqueous solvent is from, for example, 0.01 wt % to 10 wt % both inclusive, since thereby decomposition reaction of the electrolytic solution is inhibited while battery capacity is not excessively lowered.

Further, the solvent may be one of chain ester carbonates (halogenated chain ester carbonates) having one or more halogen groups and cyclic ester carbonates (halogenated cyclic ester carbonates) having one or more halogen groups. Thereby, a stable protective film is formed on the surface of the anode 22 at the time of charge and discharge, and thus decomposition reaction of the electrolytic solution is inhibited. Though the halogen group type is not particularly limited, specially, a fluorine group, a chlorine group, or a bromine group is preferable, and the fluorine group is more preferable, since thereby high effect is obtained. However, the number of halogen groups is more preferably two than one, and may be three or more. Thereby, a more rigid and more stable protective film is formed, and thus decomposition reaction of the electrolytic solution is more inhibited. The halogenated chain ester carbonate is, for example, fluoromethyl methyl carbonate, bis(fluoromethyl) carbonate, difluoromethyl methyl carbonate or the like. The halogenated cyclic ester carbonate is 4-fluoro-1,3-dioxolane-2-one, 4,5-difluoro-1,3-dioxolane-2-one or the like. The content of the halogenated chain ester carbonate and the content of the halogenated cyclic ester carbonate in the nonaqueous solvent are, for example, from 0.01 wt % to 50 wt % both inclusive, since thereby decomposition reaction of the electrolytic solution is inhibited while battery capacity is not excessively lowered.

Further, the solvent may be sultone (cyclic sulfonic ester), since thereby the chemical stability of the electrolytic solution is improved. Examples of the sultone include propane sultone and propene sultone. The sultone content in the nonaqueous solvent is, for example, from 0.5 wt % to 5 wt % both inclusive, since thereby decomposition reaction of the electrolytic solution is inhibited while battery capacity is not excessively lowered.

Further, the solvent may be an acid anhydride, since the chemical stability of the electrolytic solution is thereby further improved. Examples of the acid anhydrides include a dicarboxylic acid anhydride, a disulfonic acid anhydride, and a carboxylic acid sulfonic acid anhydride. Examples of the dicarboxylic acid anhydride include succinic anhydride, glutaric anhydride, and maleic anhydride. Examples of the disulfonic acid anhydride include anhydrous ethanedisulfonate and anhydrous propane disulfonate. Examples of the carboxylic acid sulfonic acid anhydride include anhydrous sulfobenzoic acid, anhydrous sulfopropionic acid, and anhydrous sulfobutyric acid. The content of the acid anhydride in the nonaqueous solvent is, for example, from 0.5 wt % to 5 wt % both inclusive since thereby decomposition reaction of the electrolytic solution is inhibited while battery capacity is not excessively lowered.

[Electrolyte Salt]

The electrolyte salt contains, for example, one or more of lithium salts described below. However, the electrolyte salt may be salts other than the lithium salt (for example, a light metal salt other than the lithium salt).

Examples of lithium salts include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). Thereby, superior battery capacity, superior cycle characteristics, superior storage characteristics and the like are able to be obtained.

Specially, at least one of lithium hexafluorophosphate, lithium tetrafluoroborate, lithium perchlorate, and lithium hexafluoroarsenate is preferable, and lithium hexafluorophosphate is more preferable, since thereby internal resistance is lowered, and higher effect is able to be obtained.

The content of the electrolyte salt is preferably from 0.3 mol/kg to 3.0 mol/kg both inclusive with respect to the solvent, since thereby high ion conductivity is able to be obtained.

[Operation of the Secondary Battery]

In the secondary battery, at the time of charge, for example, lithium ions extracted from the cathode 21 are inserted in the anode 22 through the electrolytic solution. Further, at the time of discharge, for example, lithium ions extracted from the anode 22 are inserted in the cathode 21 through the electrolytic solution.

[Manufacturing Method of the Secondary Battery]

The secondary battery is manufactured, for example, by the following procedure.

First, the cathode 21 is formed. First, a cathode active material is mixed with a cathode binder, a cathode conductive agent or the like according to needs to prepare a cathode mixture, which is subsequently dispersed in a solvent such as an organic solvent to obtain paste cathode mixture slurry. Subsequently, both faces of the cathode current collector 21A are coated with the cathode mixture slurry, which is dried to form the cathode active material layer 21B. After that, the cathode active material layer 21B is compression-molded by using a rolling press machine or the like while being heated if necessary. In this case, the resultant may be compression-molded over several times.

Next, the anode 22 is formed by a procedure similar to that of the foregoing cathode 21. In this case, an anode active material is mixed with an anode binder, an anode conductive agent or the like according to needs to prepare an anode mixture, which is subsequently dispersed in a solvent to form paste anode mixture slurry. Subsequently, both faces of the anode current collector 22A are coated with the anode mixture slurry, which is dried to form the anode active material layer 22B. After that, the anode active material layer 22B is compression-molded according to needs.

The anode 22 may be formed by a procedure different from that of the cathode 21. For example, the anode material is deposited on both faces of the anode current collector 22A by vapor-phase deposition method such as evaporation method to form the anode active material layer 22B.

Finally, the secondary battery is assembled by using the cathode 21 and the anode 22. First, the cathode lead 25 is attached to the cathode current collector 21A by welding or the like, and the anode lead 26 is attached to the anode current collector 22A by welding or the like. Subsequently, the cathode 21 and the anode 22 are layered with the separator 23 in between and spirally wound, and thereby the spirally wound electrode body 20 is formed. After that, the center pin 24 is inserted in the center of the spirally wound electrode body 20. Subsequently, the spirally wound electrode body 20 is sandwiched between the pair of insulating plates 12 and 13, and contained in the battery can 11. In this case, the end of the cathode lead 25 is attached to the safety valve mechanism 15 by welding or the like, and the end of the anode lead 26 is attached to the battery can 11 by welding or the like. Subsequently, the electrolytic solution is injected into the battery can 11, and the separator 23 is impregnated with the electrolytic solution. After that, at the open end of the battery can 11, the battery cover 14, the safety valve mechanism 15, and the PTC device 16 are fixed by being caulked with the gasket 17. The secondary battery illustrated in FIG. 1 and FIG. 2 is thereby completed.

[Action and Effect of the Secondary Battery]

According to the cylindrical type secondary battery, since the anode active material layer 22B of the anode 22 contains the foregoing anode active material, superior initial charge and discharge characteristics and superior cycle characteristics are able to be obtained. Other effects for the cylindrical type secondary battery are similar to those of the anode active material.

<2-2. Laminated Film Type>

Figure 3:
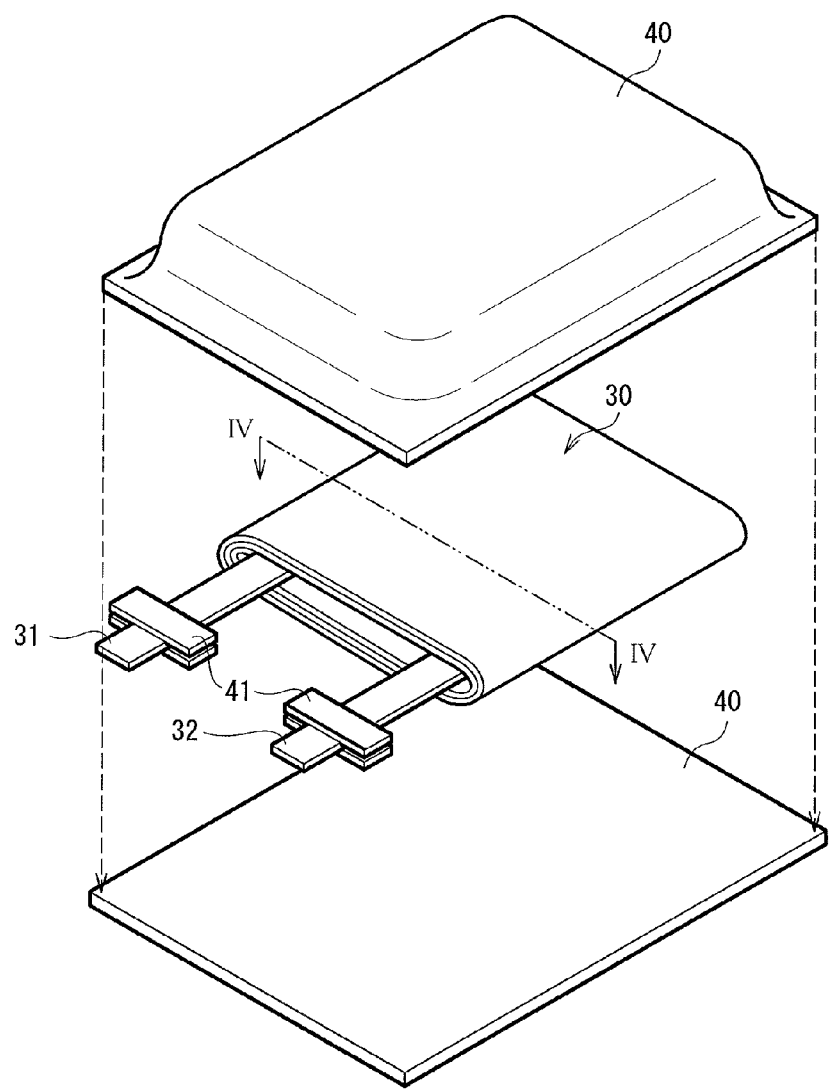
FIG. 3 is an exploded perspective view illustrating a structure of a laminated film type secondary battery using the anode active material of the embodiment of the present disclosure.
Figure 4:
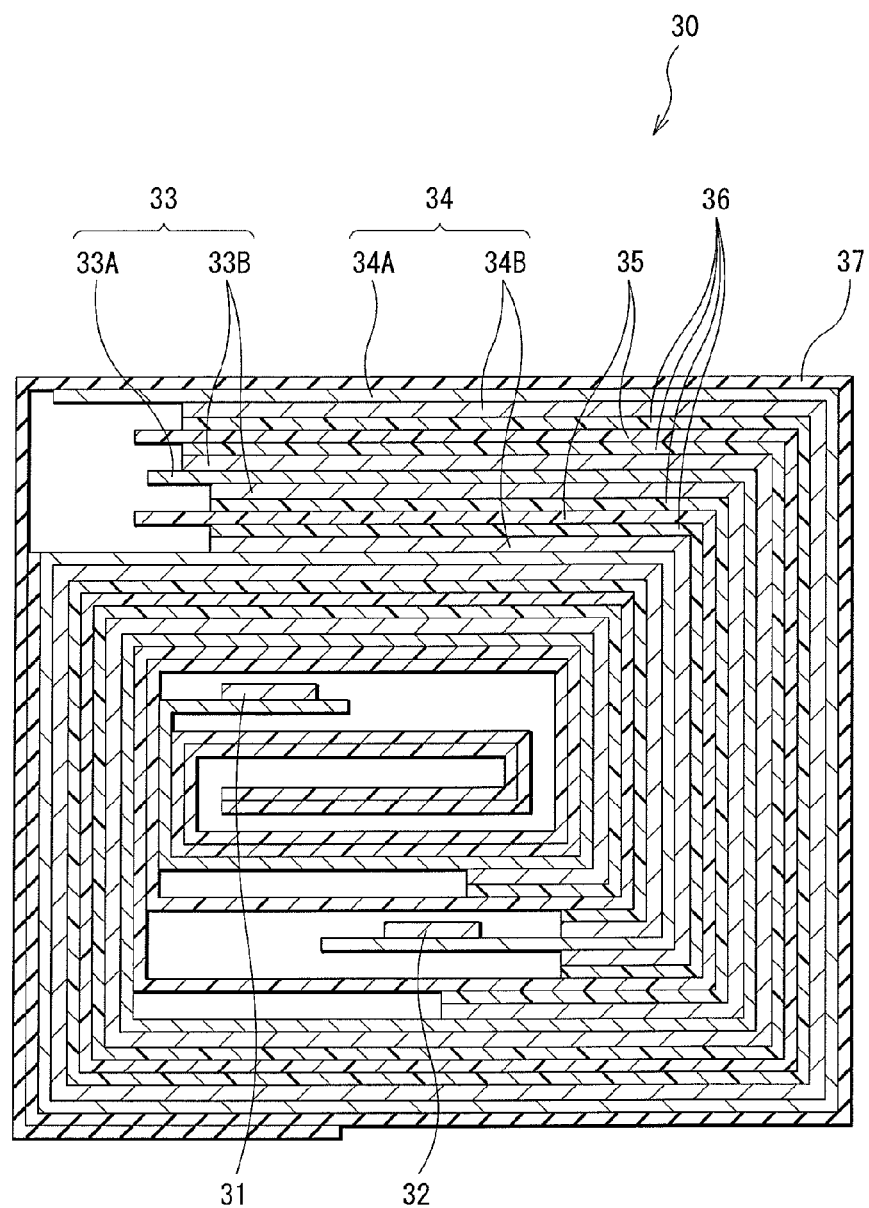
FIG. 4 is a cross sectional view illustrating a structure taken along line IV-IV of the spirally wound electrode body illustrated in FIG. 3.

FIG. 3 illustrates an exploded perspective structure of a laminated film type secondary battery. FIG. 4 illustrates an enlarged cross section taken along line IV-IV of a spirally wound electrode body 30 illustrated in FIG. 3. In the following description, the elements described for the cylindrical type secondary battery will be quoted as needed.

[Whole Structure of the Secondary Battery]

In the secondary battery, the spirally wound electrode body 30 is contained in a film package member 40 mainly. The spirally wound electrode body 30 is a spirally wound laminated body in which a cathode 33 and an anode 34 are layered with a separator 35 and an electrolyte layer 36 in between and are spirally wound. A cathode lead 31 is attached to the cathode 33, and an anode lead 32 is attached to the anode 34. The outermost peripheral section of the spirally wound electrode body 30 is protected by a protective tape 37.

The cathode lead 31 and the anode lead 32 are, for example, respectively led out from inside to outside of the package member 40 in the same direction. The cathode lead 31 is made of, for example, a conductive material such as aluminum, and the anode lead 32 is made of, for example, a conducive material such as copper, nickel, and stainless steel. These materials are in the shape of, for example, a thin plate or mesh.

The package member 40 is a laminated film in which, for example, a fusion bonding layer, a metal layer, and a surface protective layer are layered in this order. In the laminated film, for example, the respective outer edges of the fusion bonding layer of two films are bonded to each other by fusion bonding, an adhesive or the like so that the fusion bonding layer and the spirally wound electrode body 30 are opposed to each other. Examples of fusion bonding layers include a film made of polyethylene, polypropylene or the like. Examples of metal layers include an aluminum foil. Examples of surface protective layers include a film made of nylon, polyethylene terephthalate or the like.

Specially, as the package member 40, an aluminum laminated film in which a polyethylene film, an aluminum foil, and a nylon film are layered in this order is preferable. However, the package member 40 may be made of a laminated film having other laminated structure, a polymer film such as polypropylene, or a metal film.

An adhesive film 41 to protect from entering of outside air is inserted between the package member 40 and the cathode lead 31, the anode lead 32. The adhesive film 41 is made of a material having contact characteristics with respect to the cathode lead 31 and the anode lead 32. Examples of such a material include a polyolefin resin such as polyethylene, polypropylene, modified polyethylene, and modified polypropylene.

In the cathode 33, a cathode active material layer 33B is provided on both faces of a cathode current collector 33A. In the anode 34, for example, an anode active material layer 34B is provided on both faces of an anode current collector 34A. The structures of the cathode current collector 33A, the cathode active material layer 33B, the anode current collector 34A, and the anode active material layer 34B are respectively similar to the structures of the cathode current collector 21A, the cathode active material layer 21B, the anode current collector 22A, and the anode active material layer 22B. The structure of the separator 35 is similar to the structure of the separator 23.

In the electrolyte layer 36, an electrolytic solution is held by a polymer compound. The electrolyte layer 36 may contain other material such as an additive according to needs. The electrolyte layer 36 is a so-called gel electrolyte. The gel electrolyte is preferable, since high ion conductivity (for example, 1 mS/cm or more at room temperature) is obtained and liquid leakage of the electrolytic solution is prevented.

Examples of polymer compounds include one or more of the following polymer materials. That is, examples thereof include polyacrylonitrile, polyvinylidene fluoride, polytetrafluoroethylene, polyhexafluoropropylene, polyethylene oxide, polypropylene oxide, polyphosphazene, polysiloxane, and polyvinyl fluoride. Further, examples thereof include polyvinyl acetate, polyvinyl alcohol, polymethacrylic acid methyl, polyacrylic acid, polymethacrylic acid, styrene-butadiene rubber, nitrile-butadiene rubber, polystyrene, and polycarbonate. Further examples thereof include a copolymer of vinylidene fluoride and hexafluoropropylene. Specially, polyvinylidene fluoride or the copolymer of vinylidene fluoride and hexafluoropropylene is preferable, since such a polymer compound is electrochemically stable.

The composition of the electrolytic solution is similar to the composition of the electrolytic solution described in the cylindrical type secondary battery. However, in the electrolyte layer 36 as the gel electrolyte, a nonaqueous solvent of the electrolytic solution means a wide concept including not only the liquid solvent but also a material having ion conductivity capable of dissociating the electrolyte salt. Therefore, in the case where the polymer compound having ion conductivity is used, the polymer compound is also included in the solvent.

Instead of the gel electrolyte layer 36, the electrolytic solution may be directly used. In this case, the separator 35 is impregnated with the electrolytic solution.

[Operation of the Secondary Battery]

In the secondary battery, at the time of charge, for example, lithium ions extracted from the cathode 33 are inserted in the anode 34 through the electrolyte layer 36. Further, at the time of discharge, for example, lithium ions extracted from the anode 34 are inserted in the cathode 33 through the electrolyte layer 36.

[Manufacturing Method of the Secondary Battery]

The secondary battery including the gel electrolyte layer 36 is manufactured, for example, by the following three procedures.

In the first procedure, first, the cathode 33 and the anode 34 are formed by a formation procedure similar to that of the cathode 21 and the anode 22. In this case, the cathode 33 is formed by forming the cathode active material layer 33B on both faces of the cathode current collector 33A, and the anode 34 is formed by forming the anode active material layer 34B on both faces of the anode current collector 34A. Subsequently, a precursor solution containing an electrolytic solution, a polymer compound, and a solvent such as an organic solvent is prepared. After that, the cathode 33 and the anode 34 are coated with the precursor solution to form the gel electrolyte layer 36. Subsequently, the cathode lead 31 is attached to the cathode current collector 33A by welding or the like and the anode lead 32 is attached to the anode current collector 34A by welding or the like. Subsequently, the cathode 33 and the anode 34 provided with the electrolyte layer 36 are layered with the separator 35 in between and spirally wound to form the spirally wound electrode body 30. After that, the protective tape 37 is adhered to the outermost periphery thereof. Subsequently, after the spirally wound electrode body 30 is sandwiched between two pieces of film-like package members 40, outer edges of the package members 40 are contacted by thermal fusion bonding or the like to enclose the spirally wound electrode body 30 into the package members 40. In this case, the adhesive films 41 are inserted between the cathode lead 31, the anode lead 32 and the package member 40.

In the second procedure, first, the cathode lead 31 is attached to the cathode 33, and the anode lead 32 is attached to the anode 34. Subsequently, the cathode 33 and the anode 34 are layered with the separator 35 in between and spirally wound to form a spirally wound body as a precursor of the spirally wound electrode body 30. After that, the protective tape 37 is adhered to the outermost periphery thereof. Subsequently, after the spirally wound body is sandwiched between two pieces of the film-like package members 40, the outermost peripheries except for one side are bonded by thermal fusion bonding or the like to obtain a pouched state, and the spirally wound body is contained in the pouch-like package member 40. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 40. After that, the opening of the package member 40 is hermetically sealed by thermal fusion bonding or the like. After that, the monomer is thermally polymerized to obtain a polymer compound. Thereby, the gel electrolyte layer 36 is formed.

In the third procedure, the spirally wound body is formed and contained in the pouch-like package member 40 in the same manner as that of the foregoing second procedure, except that the separator 35 with both faces coated with a polymer compound is used firstly. Examples of polymer compounds with which the separator 35 is coated include a polymer containing vinylidene fluoride as a component (a homopolymer, a copolymer, a multicomponent copolymer or the like). Specific examples thereof include polyvinylidene fluoride, a binary copolymer containing vinylidene fluoride and hexafluoropropylene as a component, and a ternary copolymer containing vinylidene fluoride, hexafluoropropylene, and chlorotrifluoroethylene as a component. In addition to the polymer containing vinylidene fluoride as a component, another one or more polymer compounds may be used. Subsequently, an electrolytic solution is prepared and injected into the package member 40. After that, the opening of the package member 40 is sealed by thermal fusion bonding method or the like. After that, the resultant is heated while a weight is applied to the package member 40, and the separator 35 is contacted with the cathode 33 and the anode 34 with the polymer compound in between. Thereby, the polymer compound is impregnated with the electrolytic solution, and accordingly the polymer compound is gelated to form the electrolyte layer 36.

In the third procedure, the swollenness of the battery is inhibited compared to the first procedure. Further, in the third procedure, the monomer, the solvent and the like as a raw material of the polymer compound are hardly left in the electrolyte layer 36 compared to the second procedure. Thus, the formation step of the polymer compound is favorably controlled. Therefore, sufficient contact characteristics are obtained between the cathode 33/the anode 34/the separator 35 and the electrolyte layer 36.

[Action and Effect of the Secondary Battery]

According to the laminated film type secondary battery, the anode active material layer 34B of the anode 34 contains the foregoing anode active material. Therefore, superior initial charge and discharge characteristics and superior cycle characteristics are able to be obtained. Other effects of the laminated film type secondary battery are similar to those of the anode active material.

<2-3. Laminated Type>

Figure 5:
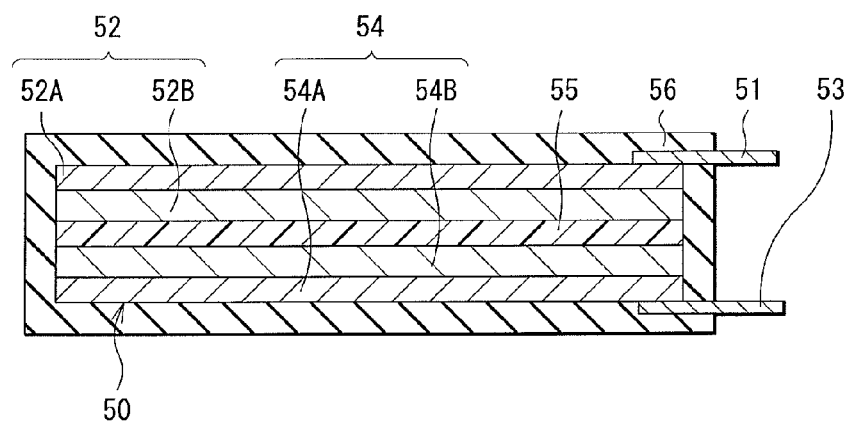
FIG. 5 is a cross sectional view illustrating a structure of a laminated type secondary battery using the anode active material of the embodiment of the present disclosure.

FIG. 5 illustrates a cross sectional structure of a laminated type secondary battery. In the following description, the elements described for the cylindrical type secondary battery will be quoted as needed.

In the secondary battery, a flat electrode body 50 is contained in a film package member 56. In the electrode body 50, a cathode 52 and an anode 54 are oppositely arranged with an electrolyte layer 55 in between. A cathode lead 51 and an anode lead 53 are respectively attached to the cathode 52 and the anode 54. The structure of the package member 56 is similar to that of the package member 40 in the foregoing laminated film type secondary battery.

The cathode 52 has a structure in which a cathode active material layer 52B is provided on a single face of a cathode current collector 52A. The anode 54 has a structure in which an anode active material layer 54B is provided on a single face of an anode current collector 54A. The anode active material layer 54B is opposed to the cathode active material layer 52B with the electrolyte layer 55 in between. The structures of the cathode current collector 52A, the cathode active material layer 52B, the anode current collector 54A, and the anode active material layer 54B are respectively similar to those of the cathode current collector 21A, the cathode active material layer 21B, the anode current collector 22A, and the anode active material layer 22B.

The electrolyte layer 55 is, for example, a solid electrolyte. The solid electrolyte may be an inorganic solid electrolyte or a polymer electrolyte as long as, for example, the solid electrolyte is a material having lithium ion conductivity. The inorganic solid electrolyte contains, for example, lithium nitride, lithium iodide or the like. The polymer solid electrolyte is mainly composed of an electrolyte salt and a polymer compound to dissolve the electrolyte salt. As the polymer compound of the polymer solid electrolyte, for example, an ether polymer compound such as polyethylene oxide and a cross-liked body containing polyethylene oxide, an ester polymer compound such as polymethacrylate, an acrylate polymer compound and the like are able to be used singly, by mixture, or in a state of copolymerization.

To form the polymer solid electrolyte, for example, a polymer compound, an electrolyte salt, and a mixed solvent are mixed, and the mixed solvent is subsequently volatilized. Otherwise, an electrolyte salt, a monomer as a raw material of a polymer compound, a polymerization initiator, other material such as a polymerization inhibitor if necessary are dissolved in a mixed solvent, the mixed solvent is volatilized, and the resultant is subsequently heated to polymerize the monomer to obtain a polymer compound.

The inorganic solid electrolyte is formed on the surface of the cathode 52 or the anode 54 by, for example, vapor-phase deposition method or liquid-phase deposition method. Examples of vapor-phase deposition methods include sputtering method, vacuum evaporation method, laser ablation method, ion plating method, and Chemical Vapor Deposition (CVD) method. Examples of liquid-phase deposition methods include sol-gel method.

[Action and Effect of the Secondary Battery]

According to the laminated type secondary battery, the anode active material layer 54B of the anode 54 contains the foregoing anode active material. Therefore, superior initial charge and discharge characteristics and superior cycle characteristics are able to be obtained. Other effects of the laminated type secondary battery are similar to those of the anode active material.

<3. Application of the Secondary Battery>

Next, a description will be given of an application example of the foregoing secondary battery.

Applications of the secondary battery are not particularly limited as long as the secondary battery is used for a machine, a device, an instrument, an apparatus, a system (collective entity of a plurality of devices and the like) or the like that is able to use the secondary battery as a drive power source, an electric power storage source for electric power storage or the like. In the case where the secondary battery is used as a power source, the secondary battery may be used as a main power source (power source used preferentially), or an auxiliary power source (power source used instead of a main power source or used being switched from the main power source). In the latter case, the main power source type is not limited to the secondary battery.

Examples of applications of the secondary battery include portable electronic devices such as a video camera, a digital still camera, a mobile phone, a notebook personal computer, a cordless phone, a headphone stereo, a portable radio, a portable television, and a Personal Digital Assistant (PDA); a lifestyle electric device such as an electric shaver; a storage equipment such as a backup power source and a memory card; an electric power tool such as an electric drill and an electric saw; a medical electronic device such as a pacemaker and a hearing aid; an electrical vehicle (including a hybrid car); and an electric power storage system such as a home battery system for storing electric power for emergency or the like.

Specially, the secondary battery is effectively applicable to the electric power tool, the electrical vehicle, the electric power storage system or the like. In these applications, since superior characteristics of the secondary battery are demanded, the characteristics are able to be effectively improved by using the secondary battery of the present disclosure. The electric power tool is a tool in which a moving part (for example, a drill or the like) is moved by using the secondary battery as a driving power source. The electrical vehicle is a vehicle that acts (runs) by using the secondary battery as a driving power source. As described above, a vehicle including the drive source as well other than the secondary battery (hybrid vehicle or the like) may be adopted. The electric power storage system is a system using the secondary battery as an electric power storage source. For example, in a home electric power storage system, electric power is stored in the secondary battery as an electric power storage source, and the electric power stored in the secondary battery is consumed according to needs. In the result, various devices such as home electric products become usable.

EXAMPLES

Specific examples of the present disclosure will be described in detail.

Examples 1-1 to 1-10

First, anode active materials were fabricated. First, as raw materials, tin powder, iron powder, cobalt powder, carbon powder, and titanium powder were prepared. Subsequently, the tin powder, the iron powder, the cobalt powder, and the titanium powder were alloyed to obtain tin-iron-cobalt-titanium alloy powder, to which the carbon powder was added and the resultant was dry-blended. In this case, the mixture ratio of the raw materials was adjusted so that the cobalt ratio to the total of iron and cobalt ($Co/(Fe+Co)$), the total ratio of iron and cobalt to the total of tin, iron, and cobalt ($(Fe+Co)/(Sn+Fe+Co)$), and titanium content were respectively constant, and only the carbon content was changed. Subsequently, 20 g of the foregoing mixture together with about 400 g of corundum being 9 mm in diameter was set into a reaction vessel of a planetary ball mill manufactured by ITO SEISAKUSHO Co., Ltd. Subsequently, after inside of the reaction vessel was substituted with argon (Ar) atmosphere, 10-minute operation at a rotational speed of 250 rpm and 10-minute break were repeated until the total operation time (reaction time) became 30 hours. Subsequently, after the reaction vessel was cooled down to room temperature, the synthesized anode active material powder was taken out, from which coarse powder was removed through a 280-mesh screen.

The obtained anode active material was analyzed. The compositions (mass %) shown in Table 1 were confirmed. In this case, a carbon-sulfur analyzer was used to measure the carbon content, and ICP (Inductively Coupled Plasma) emission spectrometry was used to measure the tin content, the iron content, the cobalt content, and the titanium content.

Further, the anode active material was analyzed by X-ray diffraction method. In the result, diffraction peaks were obtained in the range of $2\theta=$ from 20 to 50 degrees both inclusive. Of the foregoing, the half-width of the diffraction peak obtained in the range of $2\theta=$ from 34 to 37 degrees both inclusive was as illustrated in Table 1.

Figure 6:
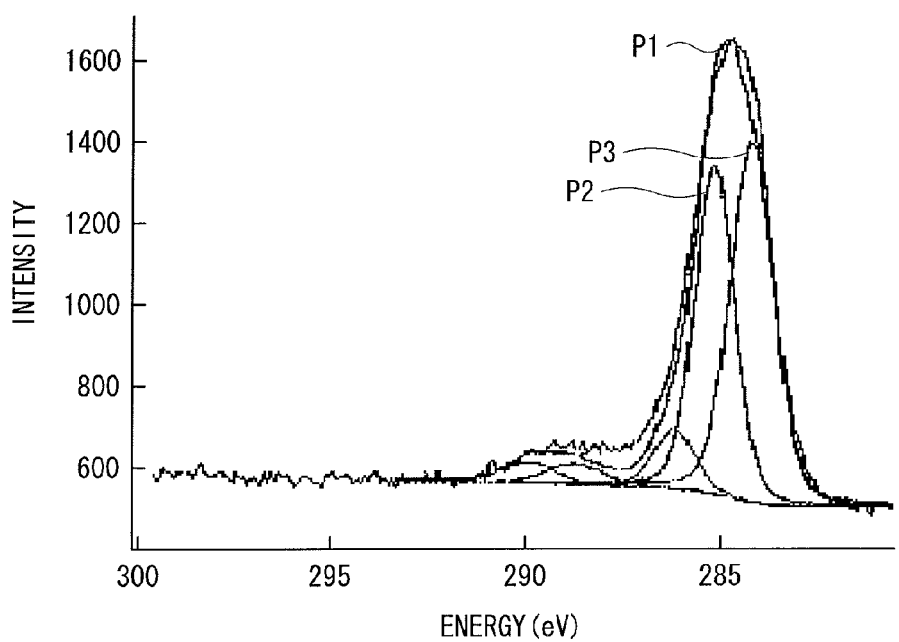
FIG. 6 is a diagram illustrating an example of peaks obtained by X-ray Photoelectron Spectroscopy (XPS).

Further, the element bonding state in the anode active material was measured by using XPS. In the result, as illustrated in FIG. 6, peak P1 was obtained. When Peak P1 was analyzed, Peak P2 of the surface contamination carbon and Peak P3 of C1s in the anode active material were obtained, and the Peak P3 was located on the energy side lower than that of Peak P2. In this case, Peak P3 was obtained in the region lower than 284.5 eV. Thus, it was confirmed that the carbon in the anode active material was bonded to other element.

Figure 7:
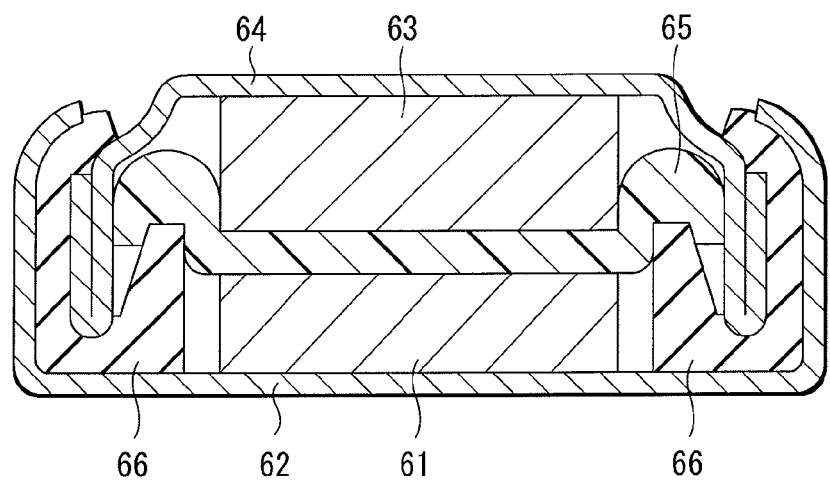
FIG. 7 is a cross sectional view illustrating a structure of a coin type secondary battery.

Next, the coin type secondary battery illustrated in FIG. 7 was fabricated by using the anode active material. In the secondary battery, a test electrode 61 using the anode active material was contained in a can 62, and a counter electrode 63 was attached to a can 64. After that, the cans 62 and 64 were layered with a separator 65 impregnated with an electrolytic solution in between, and then the resultant was caulked with a gasket 66. In forming the test electrode 61, 70 parts by mass of the anode active material, 20 parts by mass of graphite as an conductive agent and the anode active material, 1 part by mass of acetylene black as an conductive agent, and 4 parts by mass of polyvinylidene fluoride as a binder were mixed. The mixture was dispersed in an appropriate solvent to obtain slurry. After that, a copper foil current collector was coated with the slurry, which was subsequently dried, and then the resultant was punched out into a pellet being 16.4 mm in diameter. As the counter electrode 63, a lithium cobaltate ($LiCoO_2$) plate punched-out being 15.2 mm in diameter was used. In preparing an electrolytic solution, ethylene carbonate (EC), ethylmethyl carbonate (EMC), and dimethyl carbonate (DMC) as a solvent were mixed to obtain a mixed solvent, lithium hexafluorophosphate ($LiPF_6$) as an electrolyte salt was dissolved in the mixed solvent. In this case, the composition of the solvent was EC:EMC:DMC=30:10:60 at a weight ratio, and the concentration of the electrolyte salt was 1 $mol/dm^3$ (=1 mol/l).

Further, the cylindrical type secondary battery illustrated in FIG. 1 and FIG. 2 was fabricated by using the anode active material. First, a nickel oxide as a cathode active material, Ketjen black as an conductive agent, and polyvinylidene fluoride as a binder were mixed at a mass ratio of nickel oxide: Ketjen black:polyvinylidene fluoride=94:3:3. After that, the mixture was dispersed in N-methyl-2-pyrrolidone to obtain a cathode mixture slurry. Subsequently, both faces of a strip-shaped aluminum foil as the cathode current collector 21A were uniformly coated with the cathode mixture slurry, which was dried. After that, the resultant was compression-molded by using a rolling press machine to form the cathode active material layer 21B. Thereby, the cathode 21 was formed. After that, the cathode lead 25 made of aluminum was attached to an end of the cathode current collector 21A. Further, both faces of a strip-shaped copper foil as the anode current collector 22A were uniformly coated with the foregoing anode mixture slurry, which was dried. After that, the resultant was compression-molded by using a rolling press machine to form the anode active material layer 22B. Thereby, the anode 22 was formed. After that, the anode lead 26 made of nickel was attached to an end of the anode current collector 22A. Subsequently, the anode 22, the separator 23, the cathode 21, and the separator 23 were layered in this order. The resultant laminated body was spirally wound, and thereby the spirally wound electrode body 20 was formed. Subsequently, the spirally wound electrode body 20 was sandwiched between the pair of insulating plates 12 and 13, and the resultant was contained in the battery can 11 made of iron plated with nickel. At this time, the cathode lead 25 was welded to the safety valve mechanism 15, and the anode lead 26 was welded to the battery can 11. Finally, the foregoing electrolytic solution was injected into the battery can 11 by pressure reduction method.

For the coin type secondary battery, the initial charge capacity (mAh/g), the initial discharge capacity (mAh/g), and the initial efficiency (%) were examined. In addition, the capacity retention ratio (%) was examined for the cylindrical type secondary battery. Accordingly, the results illustrated in Table 1 were obtained.

In examining the initial charge capacity, constant current charge was performed at a current of 1 mA until the battery voltage reached 4.2 V. After that, constant voltage charge was performed at a voltage of 4.2 V until the current reached 100 µA. Accordingly, the charge capacity per unit mass resulting from subtracting the mass of the copper foil current collector and the binder from the mass of the test electrode 61 was obtained. Charge herein means lithium insertion reaction to the anode active material.

In examining the initial discharge capacity, after charge was performed by a procedure similar to that in the case of examining the initial charge capacity, constant current discharge at a current of 1 mA was performed until the battery voltage reached 2.5 V, and thereby the charge capacity per unit weight resulting from subtracting the mass of the copper foil current collector and the binder from the mass of the test electrode 61 was obtained. Discharge herein means lithium extraction reaction from the anode active material.

As the initial efficiency, initial efficiency (%)=(initial discharge capacity/initial charge capacity)*100 was calculated.

In examining the capacity retention ratio, at the first cycle, constant current charge at a current of 1 mA was performed until the battery voltage reached 4.2 V, and constant voltage charge at a voltage of 4.2 V was performed until the current reached 100 µA. After that, constant current discharge at a current of 1 mA was performed until the battery voltage reached 2.5 V. On and after the second cycle, constant current charge at a current of 2 mA was performed until the battery voltage reached 4.2 V, and constant voltage charge at a voltage of 4.2 V was performed until the current reached 100 µA. After that, constant current discharge at a current of 2 mA was performed until the battery voltage reached 2.5 V. After that, capacity retention ratio (%)=(discharge capacity at the 40th cycle/discharge capacity at the second cycle)*100 was calculated.

TABLE 1

Co/(Fe + Co) = 50 mass %, (Fe + Co)/(Sn + Fe + Co) = 20.5 mass %

| | Composition (mass %) | | | | | Half-width (deg) | Initial charge capacity (mAh/g) | Initial discharge capacity (mAh/g) | Initial efficiency (%) | Capacity retention ratio (%) |
|---|---|---|---|---|---|---|---|---|---|---|
| | Sn | Fe | Co | C | Ti | | | | | |
| Example 1-1 | 72 | 9.2 | 9.2 | 6 | 4 | 2.05 | 613.2 | 558.0 | 91 | 56 |
| Example 1-2 | 69 | 8.9 | 8.9 | 9 | 4 | 1.72 | 613.5 | 558.3 | 91 | 71 |
| Example 1-3 | 67 | 8.6 | 8.6 | 12 | 4 | 1.50 | 619.9 | 557.9 | 90 | 71 |
| Example 1-4 | 64 | 8.3 | 8.3 | 15 | 4 | 1.42 | 634.2 | 558.1 | 88 | 73 |

TABLE 1-continued

Co/(Fe + Co) = 50 mass %, (Fe + Co)/(Sn + Fe + Co) = 20.5 mass %

| | Composition (mass %) | | | | | Half-width (deg) | Initial charge capacity (mAh/g) | Initial discharge capacity (mAh/g) | Initial efficiency (%) | Capacity retention ratio (%) |
|---|---|---|---|---|---|---|---|---|---|---|
| | Sn | Fe | Co | C | Ti | | | | | |
| Example 1-5 | 62 | 8.0 | 8.0 | 18 | 4 | 1.33 | 640.9 | 557.6 | 87 | 74 |
| Example 1-6 | 60 | 7.7 | 7.7 | 21 | 4 | 1.31 | 655.3 | 557.0 | 85 | 73 |
| Example 1-7 | 57 | 7.4 | 7.4 | 24 | 4 | 1.27 | 679.0 | 556.8 | 82 | 73 |
| Example 1-8 | 55 | 7.1 | 7.1 | 27 | 4 | 1.18 | 683.2 | 553.4 | 81 | 71 |
| Example 1-9 | 52 | 6.8 | 6.8 | 30 | 4 | 1.13 | 673.3 | 552.1 | 82 | 70 |
| Example 1-10 | 50 | 6.5 | 6.5 | 33 | 4 | 0.62 | 694.9 | 528.1 | 76 | 58 |

As evidenced by Table 1, in the case where the carbon content was from 9 mass % to 30 mass % both inclusive, the half-width was 1 deg or more, and high initial efficiency and high capacity retention ratio were obtained while the initial discharge capacity was retained.

Examples 2-1 to 2-11

Anode active materials and secondary batteries were formed in the same manner as that of Examples 1-1 to 1-10, except that composition was changed so that only Co/(Fe+Co) was changed as illustrated in Table 2, and respective characteristics were examined. In this case, the anode active materials were analyzed by using XPS as well. Accordingly, results similar to those of Examples 1-1 to 1-10 were obtained.

width was 1 deg or more, and high initial discharge capacity, high initial efficiency, and high capacity retention ratio were obtained.

Examples 3-1 to 3-8

Anode active materials and secondary batteries were formed in the same manner as that of Examples 1-1 to 1-10, except that composition was changed so that only (Fe+Co)/(Sn+Fe+Co) was changed as illustrated in Table 3, and respective characteristics were examined. In this case, the anode active materials were analyzed by using XPS as well. Accordingly, results similar to those of Examples 1-1 to 1-10 were obtained.

TABLE 2

(Fe + Co)/(Sn + Fe + Co) = 20.5 mass %

| | Composition (mass %) | | | | | Co/(Fe + Co) | Half-width (deg) | Initial charge capacity (mAh/g) | Initial discharge capacity (mAh/g) | Initial efficiency (%) | Capacity retention ratio (%) |
|---|---|---|---|---|---|---|---|---|---|---|---|
| | Sn | Fe | Co | C | Ti | | | | | | |
| Example 2-1 | 62 | 15.2 | 0.8 | 18 | 4 | 5 | 0.88 | 637.7 | 561.2 | 88 | 49 |
| Example 2-2 | 62 | 14.4 | 1.6 | 18 | 4 | 10 | 1.03 | 629.8 | 560.5 | 89 | 71 |
| Example 2-3 | 62 | 12.8 | 3.2 | 18 | 4 | 20 | 1.15 | 628.5 | 559.4 | 89 | 72 |
| Example 2-4 | 62 | 11.2 | 4.8 | 18 | 4 | 30 | 1.11 | 625.1 | 562.6 | 90 | 71 |
| Example 2-5 | 62 | 9.6 | 6.4 | 18 | 4 | 40 | 1.21 | 637.6 | 561.1 | 88 | 73 |
| Example 2-6 | 62 | 8.0 | 8.0 | 18 | 4 | 50 | 1.33 | 640.9 | 557.6 | 87 | 74 |
| Example 2-7 | 62 | 6.4 | 9.6 | 18 | 4 | 60 | 1.48 | 647.6 | 556.9 | 86 | 76 |
| Example 2-8 | 62 | 4.8 | 11.2 | 18 | 4 | 70 | 1.67 | 649.9 | 552.4 | 85 | 77 |
| Example 2-9 | 62 | 3.2 | 12.8 | 18 | 4 | 80 | 1.92 | 644.0 | 553.8 | 86 | 80 |
| Example 2-10 | 62 | 1.6 | 14.4 | 18 | 4 | 90 | 2.41 | 639.5 | 537.2 | 84 | 82 |
| Example 2-11 | 62 | 0.8 | 15.2 | 18 | 4 | 95 | 2.95 | 626.7 | 513.9 | 82 | 81 |

As evidenced by Table 2, in the case where Co/(Fe+Co) was from 10 mass % to 80 mass % both inclusive, the half-

TABLE 3

Co/(Fe + Co) = 50 mass %

| | Composition (mass %) | | | | | (Fe + Co)/(Sn + Fe + Co) | Half-width (deg) | Initial charge capacity (mAh/g) | Initial discharge capacity (mAh/g) | Initial efficiency (%) | Capacity retention ratio (%) |
|---|---|---|---|---|---|---|---|---|---|---|---|
| | Sn | Fe | Co | C | Ti | | | | | | |
| Example 3-1 | 73 | 3.5 | 3.5 | 16 | 4 | 8.8 | 0.51 | 1062.8 | 605.8 | 57 | 48 |
| Example 3-2 | 71 | 4.5 | 4.5 | 16 | 4 | 11.3 | 1.05 | 767.3 | 598.5 | 78 | 70 |
| Example 3-3 | 69 | 5.5 | 5.5 | 16 | 4 | 13.8 | 1.21 | 743.4 | 587.3 | 79 | 73 |
| Example 3-4 | 66 | 7 | 7 | 16 | 4 | 17.5 | 1.33 | 699.3 | 573.4 | 82 | 74 |
| Example 3-5 | 63 | 8.5 | 8.5 | 16 | 4 | 21.3 | 1.48 | 676.9 | 561.8 | 83 | 79 |

TABLE 3-continued

Co/(Fe + Co) = 50 mass %

| | Composition (mass %) | | | | | (Fe + Co)/ | Half-width | Initial charge capacity | Initial discharge capacity | Initial efficiency | Capacity retention |
|---|---|---|---|---|---|---|---|---|---|---|---|
| | Sn | Fe | Co | C | Ti | (Sn + Fe + Co) | (deg) | (mAh/g) | (mAh/g) | (%) | ratio (%) |
| Example 3-6 | 61 | 9.5 | 9.5 | 16 | 4 | 23.8 | 1.57 | 656.4 | 551.4 | 84 | 81 |
| Example 3-7 | 59 | 11 | 11 | 16 | 4 | 26.3 | 2.01 | 646.6 | 549.6 | 85 | 82 |
| Example 3-8 | 56 | 12 | 12 | 16 | 4 | 30.0 | 2.31 | 490.0 | 421.4 | 86 | 88 |

As evidenced by Table 3, in the case where (Fe+Co)/(Sn+Fe+Co) was from 11.3 mass % to 26.3 mass % both inclusive, the half-width was 1 deg or more, and high initial discharge capacity, high initial efficiency, and high capacity retention ratio were obtained.

Examples 4-1 to 4-8

Anode active materials and secondary batteries were formed in the same manner as that of Examples 1-1 to 1-10, except that composition was changed so that only titanium content was changed as illustrated in Table 4, and respective characteristics were examined. In this case, the anode active materials were analyzed by using XPS as well. Accordingly, results similar to those of Examples 1-1 to 1-10 were obtained.

Examples 5-1 to 5-22

Anode active materials and secondary batteries were formed in the same manner as that of Examples 1-1 to 1-10, except that aluminum powder or the like was further used as a raw material and composition was changed so that only the type and the content of a metal element to be added were changed as illustrated in Table 5 and Table 6, and respective characteristics were examined. In this case, the anode active materials were analyzed by using XPS as well. Accordingly, results similar to those of Examples 1-1 to 1-10 were obtained.

TABLE 4

Co/(Fe + Co) = 50 mass %, (Fe + Co)/(Sn + Fe + Co) = 20.5 mass %

| | Composition (mass %) | | | | | Half-width | Initial charge capacity | Initial discharge capacity | Initial efficiency | Capacity retention |
|---|---|---|---|---|---|---|---|---|---|---|
| | Sn | Fe | Co | C | Ti | (deg) | (mAh/g) | (mAh/g) | (%) | ratio (%) |
| Example 4-1 | 65 | 8.4 | 8.4 | 18 | 0.1 | 1.35 | 733.3 | 572.0 | 78 | 61 |
| Example 4-2 | 65 | 8.4 | 8.4 | 18 | 0.5 | 1.38 | 715.5 | 572.4 | 80 | 72 |
| Example 4-3 | 64 | 8.3 | 8.3 | 18 | 1 | 1.31 | 691.6 | 567.1 | 82 | 72 |
| Example 4-4 | 64 | 8.2 | 8.2 | 18 | 2 | 1.34 | 665.6 | 565.8 | 85 | 73 |
| Example 4-5 | 62 | 8.0 | 8.0 | 18 | 4 | 1.33 | 640.9 | 557.6 | 87 | 74 |
| Example 4-6 | 60 | 7.8 | 7.8 | 18 | 6 | 1.31 | 630.1 | 554.5 | 88 | 76 |
| Example 4-7 | 59 | 7.6 | 7.6 | 18 | 8 | 1.29 | 617.5 | 549.6 | 89 | 77 |
| Example 4-8 | 57 | 7.4 | 7.4 | 18 | 10 | 1.30 | 576.0 | 512.6 | 89 | 76 |

As evidenced by Table 4, in the case where the titanium content was from 0.5 mass % to 8 mass % both inclusive, the

TABLE 5

Co/(Fe + Co) = 50 mass %, (Fe + Co)/(Sn + Fe + Co) = 20.5 mass %

| | Composition (mass %) | | | | | | Half-width | Initial charge capacity | Initial discharge capacity | Initial efficiency | Capacity retention |
|---|---|---|---|---|---|---|---|---|---|---|---|
| | Sn | Fe | Co | C | Ti | Others | (deg) | (mAh/g) | (mAh/g) | (%) | ratio (%) |
| Example 5-1 | 57.2 | 7.4 | 7.4 | 18 | 4 | 6 (Al) | 1.0 | 617.2 | 506.1 | 79 | 76 |
| Example 5-2 | 59.6 | 7.7 | 7.7 | 18 | 4 | 3 (Al) | 1.0 | 643.2 | 533.9 | 81 | 75 |
| Example 5-3 | 59.6 | 7.7 | 7.7 | 18 | 4 | 3 (Zn) | 2.1 | 657.5 | 565.5 | 85 | 70 |
| Example 5-4 | 59.6 | 7.7 | 7.7 | 18 | 4 | 3 (In) | 1.0 | 651.1 | 559.9 | 89 | 78 |
| Example 5-5 | 57.2 | 7.4 | 7.4 | 18 | 4 | 6 (Bi) | 1.1 | 648.9 | 564.5 | 84 | 61 |
| Example 5-6 | 59.6 | 7.7 | 7.7 | 18 | 4 | 3 (Bi) | 1.0 | 657.7 | 572.2 | 86 | 62 |
| Example 5-7 | 59.6 | 7.7 | 7.7 | 18 | 4 | 3 (P) | 1.2 | 725.1 | 638.1 | 86 | 68 |
| Example 5-8 | 57.2 | 7.4 | 7.4 | 18 | 4 | 6 (Sb) | 1.1 | 675.0 | 587.3 | 87 | 77 |
| Example 5-9 | 59.6 | 7.7 | 7.7 | 18 | 4 | 3 (Nb) | 2.4 | 620.6 | 533.7 | 86 | 74 |
| Example 5-10 | 57.2 | 7.4 | 7.4 | 18 | 4 | 6 (W) | 1.9 | 660.9 | 528.7 | 85 | 68 |

TABLE 5-continued

Co/(Fe + Co) = 50 mass %, (Fe + Co)/(Sn + Fe + Co) = 20.5 mass %

| | Composition (mass %) | | | | | Half-width (deg) | Initial charge capacity (mAh/g) | Initial discharge capacity (mAh/g) | Initial efficiency (%) | Capacity retention ratio (%) |
|---|---|---|---|---|---|---|---|---|---|---|
| | Sn | Fe | Co | C | Ti | Others | | | | |
| Example 5-11 | 59.6 | 7.7 | 7.7 | 18 | 4 | 3 (W) | 1.3 | 621.2 | 503.2 | 82 | 66 |
| Example 5-12 | 59.6 | 7.7 | 7.7 | 18 | 4 | 3 (Mo) | 1.3 | 631.2 | 505.0 | 82 | 69 |
| Example 5-13 | 57.2 | 7.4 | 7.4 | 18 | 4 | 6 (Ag) | 1.5 | 621.8 | 553.4 | 85 | 81 |
| Example 5-14 | 59.6 | 7.7 | 7.7 | 18 | 4 | 3 (Ag) | 1.4 | 634.0 | 557.9 | 89 | 77 |
| Example 5-15 | 59.6 | 7.7 | 7.7 | 18 | 4 | 3 (V) | 1.4 | 648.1 | 531.4 | 81 | 75 |
| Example 5-16 | 59.6 | 7.7 | 7.7 | 18 | 4 | 3 (Cr) | 1.3 | 647.5 | 537.4 | 80 | 70 |
| Example 5-17 | 59.6 | 7.7 | 7.7 | 18 | 4 | 3 (Ta) | 1.2 | 624.1 | 530.5 | 81 | 68 |

TABLE 6

Co/(Fe + Co) = 50 mass %, (Fe + Co)/(Sn + Fe + Co) = 20.5 mass %

| | Composition (mass %) | | | | | Half-width (deg) | Initial charge capacity (mAh/g) | Initial discharge capacity (mAh/g) | Initial efficiency (%) | Capacity retention ratio (%) |
|---|---|---|---|---|---|---|---|---|---|---|
| | Sn | Fe | Co | C | Ti | Others | | | | |
| Example 5-18 | 57.2 | 7.4 | 7.4 | 18 | 4 | 6 (Ni) | 1.5 | 609.1 | 517.7 | 79 | 79 |
| Example 5-19 | 59.6 | 7.7 | 7.7 | 18 | 4 | 3 (Ni) | 1.4 | 621.5 | 528.3 | 80 | 78 |
| Example 5-20 | 57.2 | 7.4 | 7.4 | 18 | 4 | 6 (Cu) | 2.1 | 617.0 | 536.8 | 87 | 80 |
| Example 5-21 | 59.6 | 7.7 | 7.7 | 18 | 4 | 3 (Cu) | 1.9 | 634.1 | 551.7 | 88 | 79 |
| Example 5-22 | 59.6 | 7.7 | 7.7 | 18 | 4 | 3 (Ga) | 1.2 | 638.4 | 523.5 | 81 | 70 |

As evidenced by Table 5 and Table 6, even if aluminum or the like was added as an element, the half-width was 1 deg or more, and high initial discharge capacity, high initial efficiency, and high capacity retention ratio were obtained. In this case, the capacity retention ratio was higher depending on the added metal element type.

From the results illustrated in Table 1 to Table 6, it was found that in the present disclosure, since the composition of the anode active material (element type and contents of the respective elements) and physical properties (half-width) were appropriate, superior initial charge and discharge characteristics and superior cycle characteristics were obtained.

The present disclosure has been described with reference to the embodiment and the examples. However, the present disclosure is not limited to the aspects described in the embodiment and the aspects described in the examples, and various modifications may be made. For example, the anode active material of the present disclosure is not necessarily limited to the secondary battery, and may be applicable to other device such as a capacitor.

Further, the secondary battery type is not limited to the lithium ion secondary battery. For example, the present disclosure is applicable to a secondary battery in which the anode capacity includes the capacity by inserting and extracting lithium ions and the capacity associated with precipitation and dissolution of lithium metal, and the anode capacity is expressed by the sum of these capacities. In this case, an anode material capable of inserting and extracting lithium ions is used as an anode active material, and the chargeable capacity of the anode material is set to a smaller value than the discharge capacity of the cathode.

Further, the secondary battery structure is not limited to the cylindrical type, the laminated film type, or the coin type, and the battery element structure is not limited to the spirally wound structure. For example, the secondary battery structure may be square type or button type, and the battery element structure may be laminated structure or the like.

Further, in the embodiment and the examples, for the carbon content in the anode active material of the present disclosure, the description has been given of the appropriate range derived from the results of the examples. However, the description does not totally deny a possibility that the content is out of the foregoing range. That is, the foregoing appropriate range is the range particularly preferable for obtaining the effects of the present disclosure. Therefore, as long as effect of the present disclosure is obtained, the content may be out of the foregoing range in some degrees. Such a fact is not limited to the carbon content, and is similarly applicable to Co/(Fe+Co), (Fe+Co)/(Sn+Fe+Co), the titanium content, the half-width or the like.

The present disclosure contains subject matter related to that disclosed in Japanese Priority Patent Application JP 2010-204626 filed in the Japanese Patent Office on Sep. 13, 2010, the entire contents of which is hereby incorporated by reference.

It should be understood by those skilled in the art that various modifications, combinations, sub combinations and alternations may occur depending on design requirements and other factors insofar as they are within the scope of the appended claims or the equivalents thereof.

What is claimed is:

1. An anode active material containing tin (Sn), iron (Fe), cobalt (Co), carbon (C), and titanium (Ti) as an element,
   wherein a carbon content is from 9 mass % to 30 mass % both inclusive, a ratio of the cobalt to total of iron and cobalt (Co/(Fe+Co)) is from 10 mass % to 80 mass % both inclusive, a ratio of the total of iron and cobalt to total of tin, iron, and cobalt ((Fe+Co)/(Sn+Fe+Co)) is from 11.3 mass % to 26.3 mass % both inclusive, and a titanium content is from 0.5 mass % to 8 mass % both inclusive, and wherein a half-width of diffraction peak obtained by X-ray diffraction, which is a peak obtained where a diffraction angle of 2θ is from 34 deg to 37 deg both inclusive, is 1 deg or more.

2. The anode active material according to claim 1 further containing at least one of silver (Ag), phosphorus (P), antimony (Sb), aluminum (Al), vanadium (V), chromium (Cr), niobium (Nb), bismuth (Bi), tantalum (Ta), nickel (Ni), copper (Cu), zinc (Zn), gallium (Ga), indium (In), tungsten (W), and molybdenum (Mo) as an element.

3. The anode active material according to claim 1, wherein is peak of the carbon is obtained in a region lower than 284.5 eV by X-ray Photoelectron Spectroscopy.

4. A secondary battery comprising:
a cathode;
an anode containing an anode active material; and
an electrolytic solution,
wherein the anode active material contains tin, iron, cobalt, carbon, and titanium as an element,
wherein in the anode active material, a carbon content is from 9 mass % to 30 mass % both inclusive, a ratio of cobalt to total of iron and cobalt is from 10 mass % to 80 mass % both inclusive, a ratio of the total of iron and cobalt to total of tin, iron, and cobalt is from 11.3 mass % to 26.3 mass % both inclusive, a titanium content is from 0.5 mass % to 8 mass % both inclusive, and
wherein a half-width of a diffraction peak obtained by X-ray diffraction, which is a peak obtained where a diffraction angle of 2θ is from 34 deg to 37 deg both inclusive is 1 deg or more.

5. The secondary battery according to claim 4, wherein the anode active material further contains at least one of silver, phosphorus, antimony, aluminum, vanadium, chromium, niobium, bismuth, tantalum, nickel, copper, zinc, gallium, indium, tungsten, and molybdenum as an element.

6. The secondary battery according to claim 4, wherein in the anode active material, 1s peak of the carbon is obtained in a region lower than 284.5 eV by X-ray Photoelectron Spectroscopy.

7. The secondary battery according to claim 4, wherein the secondary battery is a lithium ion secondary battery.

8. An electric power tool moving with the use of a secondary battery including a cathode, an anode, and an electrolytic solution as a power source,
wherein the anode contains an anode active material containing tin, iron, cobalt, carbon, and titanium as an element,
wherein in the anode active material, a carbon content is from 9 mass % to 30 mass % both inclusive, a ratio of cobalt to total of iron and cobalt is from 10 mass % to 80 mass % both inclusive, a ratio of the total of iron and cobalt to total of tin, iron, and cobalt is from 11.3 mass % to 26.3 mass % both inclusive, a titanium content is from 0.5 mass % to 8 mass % both inclusive, and
wherein a half-width of a diffraction peak obtained by X-ray diffraction, which is a peak obtained where a diffraction angle of 2θ is from 34 deg to 37 deg both inclusive is 1 deg or more.

9. An electrical vehicle moving with the use of a secondary battery including a cathode, an anode, and an electrolytic solution as a power source,
wherein the anode contains an anode active material containing tin, iron, cobalt, carbon, and titanium as an element,
wherein in the anode active material, a carbon content is from 9 mass % to 30 mass % both inclusive, a ratio of cobalt to total of iron and cobalt is from 10 mass % to 80 mass % both inclusive, a ratio of the total of iron and cobalt to total of tin, iron, and cobalt is from 11.3 mass % to 26.3 mass % both inclusive, a titanium content is from 0.5 mass % to 8 mass % both inclusive, and
wherein a half-width of a diffraction peak obtained by X-ray diffraction, which is a peak obtained where a diffraction angle of 2θ is from 34 deg to 37 deg both inclusive is 1 deg or more.

10. An electric power storage system using a secondary battery including a cathode, an anode, and an electrolytic solution as a power storage source,
wherein the anode contains an anode active material containing tin, iron, cobalt, carbon, and titanium as an element,
wherein in the anode active material, a carbon content is from 9 mass % to 30 mass % both inclusive, a ratio of cobalt to total of iron and cobalt is from 10 mass % to 80 mass % both inclusive, a ratio of the total of iron and cobalt to total of tin, iron, and cobalt is from 11.3 mass % to 26.3 mass % both inclusive, a titanium content is from 0.5 mass % to 8 mass % both inclusive, and
wherein a half-width of a diffraction peak obtained by X-ray diffraction, which is a peak obtained where a diffraction angle of 2θ is from 34 deg to 37 deg both inclusive is 1 deg or more.

* * * * *